(12) United States Patent
Lechner et al.

(10) Patent No.: US 10,837,808 B2
(45) Date of Patent: Nov. 17, 2020

(54) DEVICE AND METHOD FOR TESTING THE PLAUSIBILITY OF SIGNALS OF A ROTARY ENCODER

(71) Applicant: Robert Bosch GmbH, Stuttgart (DE)

(72) Inventors: Benjamin Lechner, Neuhausen (DE); Daniel Zirkel, Wiernsheim-Serres (DE); Daniel Raichle, Vaihingen (DE); Michael Ungermann, Darmstadt (DE)

(73) Assignee: Robert Bosch GmbH, Stuttgart (DE)

( * ) Notice: Subject to any disclaimer, the term of this patent is extended or adjusted under 35 U.S.C. 154(b) by 320 days.

(21) Appl. No.: 15/736,029

(22) PCT Filed: Jun. 13, 2016

(86) PCT No.: PCT/EP2016/063499
§ 371 (c)(1),
(2) Date: Dec. 13, 2017

(87) PCT Pub. No.: WO2016/202741
PCT Pub. Date: Dec. 22, 2016

(65) Prior Publication Data
US 2018/0172485 A1 Jun. 21, 2018

(30) Foreign Application Priority Data
Jun. 18, 2015 (DE) .......... 10 2015 211 259

(51) Int. Cl.
*G01D 18/00* (2006.01)
*G01D 5/244* (2006.01)
*G01D 5/20* (2006.01)
*G01B 7/30* (2006.01)

(52) U.S. Cl.
CPC .............. *G01D 18/00* (2013.01); *G01D 5/20* (2013.01); *G01D 5/24461* (2013.01); *G01B 7/30* (2013.01)

(58) Field of Classification Search
None
See application file for complete search history.

(56) References Cited

U.S. PATENT DOCUMENTS 9,151,645 B2 * 10/2015 Hagenauer ........... G01D 5/2073
2009/0206828 A1 * 8/2009 Yamaura .................. G01B 7/30
324/207.25

(Continued)

FOREIGN PATENT DOCUMENTS

| DE | 102008022979 | 2/2009 |
| DE | 102011078583 | 1/2013 |

(Continued)

OTHER PUBLICATIONS

How to Implement Comparators for Improving Performance of Rotary Encoders in Industrial Drive Applications, Aug. 2019, Texas Instruments, 5 pages, (Year: 2019).*

(Continued)

*Primary Examiner* — Tung S Lau
(74) *Attorney, Agent, or Firm* — Michael Best & Friedrich LLP

(57) ABSTRACT

The invention relates to a device and a method for testing the plausibility of signals of a rotary encoder. The device is formed with: a sine signal-providing device (11) designed to provide a sine signal (51) of the rotary encoder (12); a cosine signal-providing device (12) designed to provide a cosine signal (52) of the rotary encoder (12); a calculation device (14) designed to form a calculation signal (53) based on the sine signal (51) and the cosine signal (52); a maximum value-determining device (16) designed to determine a maximum value of the calculation signal (53); a minimum value-determining device (18) designed to determine a minimum value of the calculation signal (53); a determining device (20) designed to determine a differential signal (56) as or based on a value of a difference between the deter- (Continued)

mined maximum value and the determined minimum value, and which differential signal indicates an amplitude difference between an amplitude of the sine signal (51) and an amplitude of the cosine signal (52); and a plausibility device (22) designed to test the plausibility of the sine signal (51) and the cosine signal (52), in the event that the differential signal (56) falls within a predetermined region.

2 Claims, 2 Drawing Sheets

(56) References Cited

U.S. PATENT DOCUMENTS

2009/0322351 A1\* 12/2009 McLeod .............. H03K 17/962
                                                      324/658
2012/0185213 A1\* 7/2012 Wada ...................... G01D 3/08
                                                      702/183
2014/0142782 A1   5/2014 Fu et al.
2014/0148948 A1\* 5/2014 Hagenauer ........... G01D 5/2073
                                                      700/245

FOREIGN PATENT DOCUMENTS

DE      102011079116      1/2013
EP      2562516           2/2013

OTHER PUBLICATIONS

Steven T. Jenkins ( Sin/cosine encoder interpolation methods: encoder to digital tracking converters for rate and position loop controllers), 15 pages, 2008 (Year: 2008).\*

International Search Report for Application No. PCT/EP2016/063499 dated Oct. 24, 2016 (English Translation, 3 pages).

\* cited by examiner

DEVICE AND METHOD FOR TESTING THE PLAUSIBILITY OF SIGNALS OF A ROTARY ENCODER

BACKGROUND OF THE INVENTION

The present invention relates to a device and a method for testing the plausibility of signals of a rotary encoder, in particular for an angle of rotation of a rotor of an electric machine. In particular, the present invention relates to a device and a method for testing the plausibility of the output signals of a rotary encoder, for example, of a resolver.

Electric and hybrid vehicles are becoming increasingly important. For controlling permanently-excited synchronous machines (PSM) and electrically excited synchronous machines (ESM) as are used in such vehicles, knowledge of the rotor position angle of such machines is required. Furthermore, for controlling asynchronous machines (ASM), knowledge of the electrical frequency of the drive is necessary. Various types of sensors may be used for ascertaining the rotor position angle and the electrical frequency. For example, sensors based on the eddy-current effect, resolvers, or digital angle sensors are possible.

A resolver is excited, for example, by a sinusoidal carrier signal. It is possible to obtain the information about the rotor position from the envelopes of perturbed amplitude-modulated voltages which are generally received as receiver signals of the resolver.

Devices for detecting angles of rotation, which are referred to as rotary encoders below, often use sinusoidal signals which are proportional to a sine $\sin(\varphi(t))$ of the time-dependent angle of rotation $\varphi(t)$ and/or cosine signals which are proportional to a cosine $\cos(\varphi(t))$ of the angle of rotation, or use these signals in signal processing, to calculate the angle of rotation.

German patent application DE 10 2011 078 583 A1 discloses, for example, an evaluation of resolver sensor signals in a vehicle. For this purpose, a resolver sensor records a rotational motion of a rotor, and a processor element processes the sine-shaped or cosine-shaped output voltages of the resolver.

With a resolver, the angular position of the rotor may be inferred from the output voltages from the stator windings. Conventional evaluation circuits pose explicit and implicit requirements with respect to the quality of the receiver signals from the stator windings.

If such a sine signal and such a cosine signal have different amplitudes, this may, for example, result in an error in the calculation of the angle of rotation when calculating the angle of rotation, i.e., the angular position, by means of an arctangent.

Therefore, there is a need for a method and a device for ascertaining and testing the plausibility of an amplitude difference between the sine and cosine signals.

SUMMARY OF THE INVENTION

A device is provided for testing the plausibility of signals of a rotary encoder, including: a sine signal provision device which is designed to provide a sine signal of the rotary encoder which indicates a sine function $\sin(\varphi(t))$ of a time-dependent angle of rotation $\varphi(t)$; a cosine provision device which is designed to provide a cosine signal of the rotary encoder which indicates a cosine function $\cos(\varphi(t))$ of a time-dependent angle of rotation $\varphi(t)$; a computing device which is designed to form a calculation signal based on the provided sine signal and the provided cosine signal; a maximum value determination device which is designed to determine a maximum value of the calculation signal; a minimum value determination device which is designed to determine a minimum value of the calculation signal; a determination device which is designed to determine a difference signal which indicates an amplitude difference between an amplitude of the sine signal and an amplitude of the cosine signal, as, or based on, a magnitude of a difference between the determined maximum value and the determined minimum value; and a plausibility testing device which is designed to test the plausibility of the sine signal and the cosine signal, if the difference signal lies within a predetermined range.

The angle of rotation may in particular be the rotor position angle of a rotor of a synchronous machine. Testing the plausibility is in particular to be understood to mean determining that a value of an ascertained signal is plausible, i.e., reliable and/or based on correct measurements. During further processing of the ascertained signal, preferably, only values of the signal are considered which are determined to be plausible. Plausibility testing may comprise outputting a signal which indicates the plausibility of the ascertained signal.

The present invention furthermore provides a method for testing the plausibility of signals of a rotary encoder, including the steps of: providing a sine signal of the rotary encoder which indicates a sine function $\sin(\varphi(t))$ of a time-dependent angle of rotation $\varphi(t)$; providing a cosine signal of the rotary encoder which indicates a cosine function $\cos(\varphi(t))$ of the time-dependent angle of rotation $\varphi(t)$; forming a calculation signal based on the provided sine signal and the provided cosine signal; determining a maximum value of the calculation signal; determining a minimum value of the calculation signal; determining a difference signal which indicates an amplitude difference between an amplitude of the sine signal and an amplitude of the cosine signal, as, or based on, a magnitude of a difference between the maximum value and the minimum value; and testing the plausibility of the sine signal and the cosine signal if the difference signal lies within a predetermined range.

Providing a sine signal or cosine signal may in particular be understood to mean receiving or generating a sine signal or cosine signal.

The method may be carried out in particular continuously, for example, once per period of the sine signal and/or cosine signal.

The finding which underlies the present invention is that calculating and/or testing the plausibility of an amplitude difference between the sine signal and the cosine signal of a rotary encoder may be based on a single calculation signal which is a function of both the sine signal and cosine signal.

According to the present invention, a value for the amplitude difference between an amplitude of the sine signal and an amplitude of the cosine signal may be available directly after completion of one electrical period by a rotor of a rotating machine, in particular a synchronous machine, without these amplitudes having to be individually estimated or learned. Since no complex estimation methods must be carried out, it is thus possible to carry out the method according to the present invention particularly rapidly.

Advantageous specific embodiments and refinements result from the subclaims and from the description with reference to the figures.

According to one advantageous refinement, the maximum value determination device and the minimum value determination device are designed to determine the maximum value and the minimum value within a predetermined time span of the sine signal and the cosine signal and/or within a predetermined number of complete electrical rotations of the rotor. In particular, the maximum value determination device and the minimum value determination device may be designed to determine the maximum value and the minimum value within one period duration of the sine signal and the cosine signal and/or within exactly one complete electrical rotation of the rotor. Thus, it is possible to test the plausibility of the amplitude difference particularly rapidly.

According to another additional refinement, the calculation signal is based on the square of the sine signal and on the square of the cosine signal. According to another advantageous refinement, the computing device is designed to determine the calculation signal based on a sum of the square of the sine signal and the square of the cosine signal, or based on a square root of the aforementioned sum. According to another advantageous refinement, the computing device is designed to determine the calculation signal as the square root of the sum of the square of the sine signal and the square of the cosine signal. A meaningful calculation signal having content which is sufficient for the plausibility testing may thereby be generated with little technical complexity.

According to one advantageous refinement of the present invention, the maximum value and the minimum value are determined within a predetermined time span of the sine signal and the cosine signal and/or within a predetermined number of complete electrical rotations of the rotor. In particular, the maximum value and the minimum value may be determined within one period duration of the sine signal and the cosine signal and/or within exactly one complete electrical rotation of the rotor.

According to another additional refinement, the calculation signal is based on the square of the sine signal and on the square of the cosine signal. According to another advantageous refinement, the calculation signal is based on a square root of a sum of the square of the sine signal and the square of the cosine signal, or is equal to the square root of the sum of the square of the sine signal and the square of the cosine signal.

BRIEF DESCRIPTION OF THE DRAWINGS

The present invention will be described in greater detail below based on the exemplary embodiments which are depicted in the schematic figures of the drawings. The following are shown.

Figure 1:
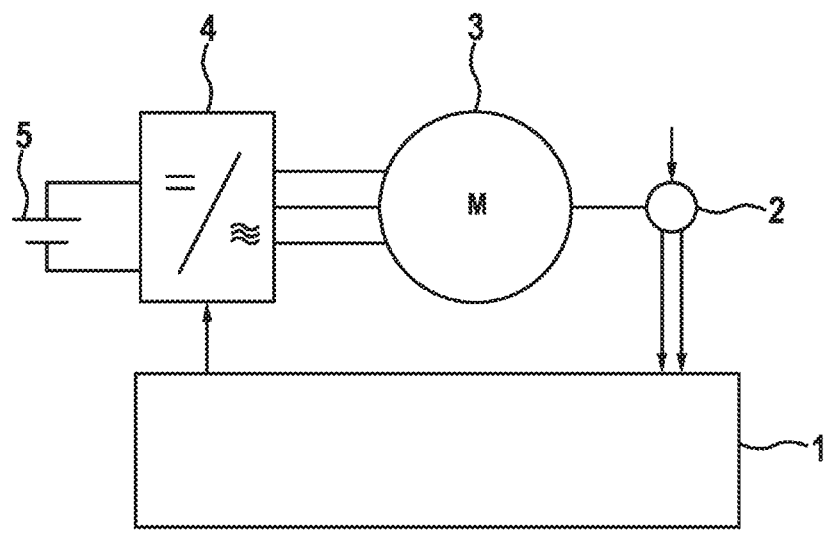
FIG. 1 shows a schematic block diagram of an electric drive system according to one embodiment of the present invention.

In all figures, identical or functionally identical elements and devices have been provided with the same reference characters, unless stated otherwise. The numbering of method steps is provided for the sake of the clarity and is in particular not to imply a specific chronological sequence, unless otherwise stated. In particular, multiple method steps may also be carried out simultaneously.

DETAILED DESCRIPTION

FIG. 1 shows a schematic block diagram of an electrical drive system according to one embodiment. An electric machine 3 is fed by an electrical power source 5 via a rectifier 4. For example, the electrical power source 5 may be a traction battery of an electric vehicle. The electric machine 3 may, for example, be a permanently excited synchronous machine, an electrically excited synchronous machine, or an asynchronous machine. In addition, other electric machines are also generally possible. The embodiment depicted here of a three-phase electric machine 3 constitutes only one exemplary embodiment. In addition, electric machines having a number of phases differing from three are also possible. The rectifier 4 converts the electrical power provided by the electrical power source 5 and provides the converted electrical power for controlling the electric machine 3. The control of the electric machine 3 may be carried out based on specifications or control signals from a control device 1. In addition, when braking the electric machine 3, kinetic energy may also be converted into electrical energy by the electric machine 3, and this electrical energy may be fed into an electric energy storage device of the power source 5 via the rectifier 4.

For controlling a permanently or electrically excited synchronous machine, knowledge of the position of the rotor in this machine is required. Furthermore, for controlling asynchronous machines, knowledge of the electrical frequency of such a machine is necessary. For this purpose, the electric machine 3 may be coupled to a rotary encoder 2. For example, the rotary encoder 2 may be coupled to the drive axis of the electric machine 3. For example, for determining the rotor position and/or the electrical frequency of the machine 3, sensors based on the eddy-current effect, digital angle encoder signals, or so-called resolvers are possible.

In a resolver, two stator windings are generally arranged in a housing, said windings being electrically offset by 90° and surrounding a rotor which is mounted in the housing and which has an excitation winding. Various alternatives for ascertaining the winding position are generally possible, of which one possibility will be described below by way of example. For example, the rotor winding may be excited by a sinusoidal AC voltage. The amplitudes of the voltages induced in the two stator windings are a function of the angular position of the rotor and induce the sine of the angular position of the rotor (initial sine signal) and the cosine of the angular position of the rotor (initial cosine signal). The electrical oscillations induced by the exciting AC voltage are amplitude-modulated in the initial sine signal and the initial cosine signal via the motion of the rotor. Thus, by demodulating the initial sine signal and the initial cosine signal, the angular position of the rotor may be calculated from the arctangent (arctan) of the envelopes of the signals of the two stator windings.

The ascertainment of the angular position of the rotor and the electrical frequency takes place in the control device 1. For the plausibility testing, the signals are processed as described below. For this purpose, the control device 1 comprises a device 10 according to the present invention for testing the plausibility of signals of the rotary encoder 2, as described in greater detail based on FIG. 2.

Figure 2:
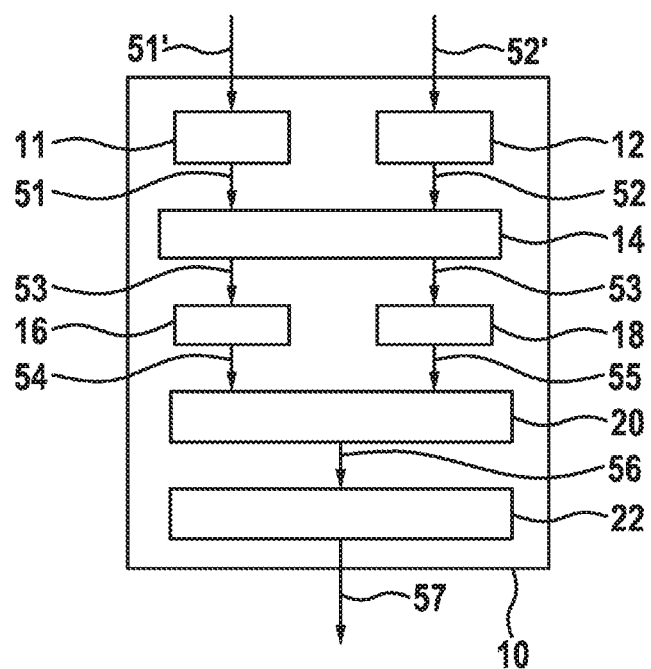
FIG. 2 shows a schematic representation of a device for testing the plausibility of signals of a rotary encoder, according to another embodiment of the present invention.

FIG. 2 shows a schematic representation of a device 10 for testing the plausibility of signals of a rotary encoder 2.

The sine signal 51 of the rotary encoder 2 is provided by a sine signal provision device 11 of the device 10, and the cosine signal 52 of the rotary encoder 2 is provided by a cosine signal provision device 12 of the device 10. In particular, if the rotary encoder 2 is a resolver, a demodulation of the sensor signals, i.e., the initial sine signal 51' and the initial cosine signal 52', may be carried out via the sine signal provision device 11 and the cosine signal provision device 12.

The sine signal provision device 11 and the cosine signal provision device 12 may respectively comprise an analog-digital converter. If an analog-modulated initial sine signal 51' and an analog-modulated initial cosine signal 52' of a resolver are received by the sine signal provision device 11 and the cosine provision device 12, first, an analog-to-digital conversion, and then, a digital demodulation, may be carried out respectively by the sine signal provision device 11 and the cosine provision device 12, or an analog demodulation of the initial sine signal 51' and of the initial cosine signal 52', and a subsequent respective analog-to-digital conversion, may initially be carried out. A single analog-digital converter may also be used by both the sine signal provision device 11 and the cosine signal provision device 12. The analog-digital converter(s) may be designed to sample the analog sensor signals 51', 52' from the rotary encoder 2 at a fixedly predetermined sampling frequency and a predetermined resolution, and to convert them into a digital signal.

Alternatively, an already-demodulated initial sine signal 51' and initial cosine signal 52', for instance, of a rotor position encoder acting as a rotary encoder 2, may also be respectively received by the sine signal provision device 11 and the cosine signal provision device 12, and correspondingly provided to the device 10 as a sine signal 51 and as a cosine signal 52. The sine signal provision device 11 and the cosine signal provision device 12 may have a respective or a shared analog-to-digital converter, in order to convert a possible analog demodulated initial sine signal 51' into digital sine signal 51, and to convert an analog demodulated initial cosine signal 52' into a digital cosine signal 52, and to provide them to the device 10.

Alternatively, the sine signal provision device 11 and the cosine provision device 12 may also be configured to generate the sine signal 51 and the cosine signal 52, i.e., in that the rotary encoder 2, the sine signal provision device 11, and the cosine signal provision device 12 are integrated with one another.

In other words, the sensor signals 51', 52' received by the sine signal provision device 11 and by the cosine provision device 12, on the basis of which the sine signal 51 and the cosine signal 52 are provided, may, for example, be analog demodulated signals, analog modulated signals, or digital signals. The sensor signals 51' and 52' may in particular be proportional to the sine and the cosine of the angle of rotation.

If the sine signal 51 is denoted by $U_{Sin}(\varphi(t))$ and the cosine signal 52 is denoted by $U_{Cos}(\varphi(t))$, the sine signal 51 may be described by $$U_{Sin}(\varphi(t)) = U_{Sin\,Amp} \sin(\varphi(t))$$

where $U_{Sin\,Amp}$ represents an amplitude of the sine signal 51, and the cosine signal 52 may be described by $$U_{Cos}(\varphi(t)) = U_{Cos\,Amp} \cos(\varphi(t))$$

where $U_{Cos\,Amp}$ represents an amplitude of the cosine signal 52.

Subsequently, a calculation signal 53 is formed by a computing device 14, based on the provided sine signal 51 and the provided cosine signal 52.

In particular, initially, the sine signal 51 is squared via a sine signal squaring unit of the computing device 14, and the cosine signal 52 is squared via a cosine signal squaring unit of the computing device 14. The squared sine signal and the squared cosine signal are added via an adding unit of the computing device 14 and passed for output to an output unit of the computing device 14 as a calculation signal 53.

Alternatively, it may be provided that the output of the adding unit is passed to a square-root formation unit of the computing device 14, instead of to the output unit. The square-root formation unit is designed to calculate a square root from the output of the adding unit, and to pass a result of the calculation of the square root to the output unit of the computing device 14 for output as a calculation signal 53. Since the square root is a strongly monotone function, the square root of an expression is extremal if the expression itself is extremal. Instead of the square-root formation unit, a general function formation unit may be provided. The function formation unit may be designed to form a monotone function, in particular a strongly monotone function, of the output of the adding unit, and to pass it to the output unit. The square-root formation unit may be considered to be a special case of the function formation unit.

If the calculation signal 53 is denoted as $U_{Sin\,Cos}(\varphi(t))$, the calculation signal 53 which is output by the output unit may thus assume the form $$U_{Sin\,Cos}(\varphi(t)) = U_{Sin}(\varphi(t))^2 + U_{Cos}(\varphi(t))^2$$

or, alternatively, the form $$U_{Sin\,Cos}(\varphi(t)) = \sqrt{U_{Sin}(\varphi(t))^2 + U_{Cos}(\varphi(t))^2}.$$

A maximum value 54 of the calculation signal 53 is determined via a maximum value determination device 16 of the device 10, in particular within at least one period duration of the sine signal 51 and the cosine signal 52, preferably within an integer multiple of a period duration of the sine signal 51 and the cosine signal 52, particularly preferably within exactly one period duration of the sine signal 51 and the cosine signal 52. A minimum value 55 of the calculation signal 53 is determined via a minimum value determination device 18, in particular as described with respect to the maximum value determination device 16.

Information about the angle of rotation and/or about a period of the rotor may be passed to the maximum value determination device 16 and the minimum value determination device 18 for determining the maximum value 54 and the minimum value 55, for example, via the control device 1.

By means of a determination device 20, a difference signal 56 is determined which indicates an amplitude difference between the amplitude $U_{Sin\,Amp}$ of the sine signal 51 and the amplitude $U_{Cos\,Amp}$ of the cosine signal 52. The difference signal 56 is based on, or is equal to, a magnitude of a difference between the determined maximum value 54 and the determined minimum value 55.

Thus, the difference signal 56, if denoted by $U_{AmpDiff}$, may be determined from the calculation signal $U_{Sin\,Cos}$ by the determination device 20 within an nth period of the rotor, the angle of rotation of which is to be determined, as $$U_{AmpDiff}(t) = \left| \max_{\varphi(t)\in[2\pi n, 2\pi(n+1)]} (U_{SinCos}(t)) - \min_{\varphi(t)\in[2\pi n, 2\pi(n+1)]} (U_{SinCos}(t)) \right|.$$

Alternatively, the difference signal 56 may be determined as the magnitude of the difference between the determined maximum value 54 and the determined minimum value 55, divided by the average value of the maximum value 54 and the minimum value 55. The difference signal 56 may also be determined as the magnitude of the difference between the determined maximum value 54 and the determined minimum value 55, divided by the minimum value 54. These two variants are advantageous if an amplitude ratio, rather than an amplitude difference, is specified for the rotary encoder 2.

The difference signal 56 is passed by the determination device 20 to a plausibility testing device 22 which is designed to test the plausibility of the sine signal 51 and the cosine signal 52, if the difference signal 56 lies within a predetermined range. In particular, the plausibility testing device 22 may be configured to test the plausibility of the sine signal 51 and the cosine signal 52, if the value of the difference signal 56 lies below a threshold $\sigma_{AmpDiff}$.

If the sine signal 51 and the cosine signal 52 are plausibility-tested, a plausibility signal 57 may be output by the plausibility testing device 22, which indicates that the sine signal 51 and the cosine signal 52 are plausible, for example, by outputting a logical one. If they are not plausible, the plausibility signal 57 may indicate that the sine signal 51 and the cosine signal 52 are not plausible, for example, by outputting a logical zero.

Figure 3:
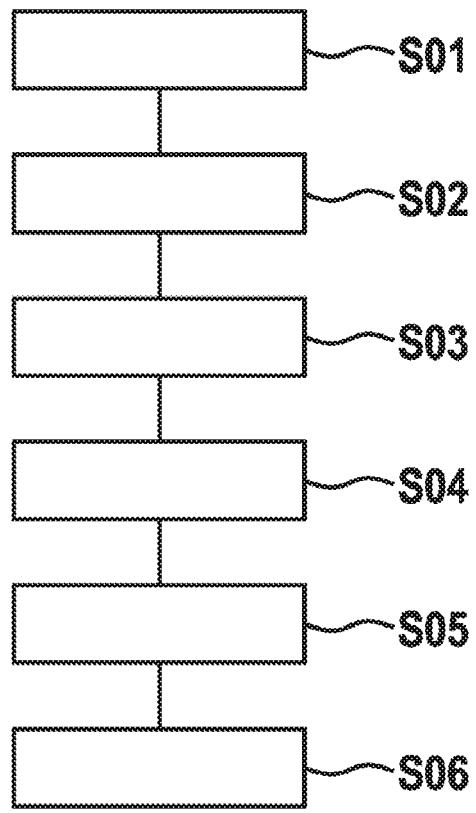
FIG. 3 shows a schematic flow chart for explaining a method for testing the plausibility of signals of a rotary encoder, according to another embodiment of the present invention.

FIG. 3 shows a schematic flow chart for explaining a method for testing the plausibility of signals of a rotary encoder according to yet another embodiment of the present invention. The method according to FIG. 3 may be implemented in particular via a device according to FIG. 2, and may be adapted with respect to all variants and refinements described in conjunction with the device according to the present invention, and vice-versa.

In a step S01, a sine signal 51 of the rotary encoder 2 is received or generated, which comprises or indicates a sine function $\sin(\varphi(t))$ of a time-dependent angle of rotation $\varphi(t)$. In a step S02, a cosine signal 52 of the rotary encoder 2 is received or generated in parallel, which comprises or indicates a cosine function $\cos(\varphi(t))$ of the time-dependent angle of rotation $\varphi(t)$. In a step S03, a calculation signal 53 is determined, in particular calculated as described with respect to FIG. 2, based on the received or generated sine signal 51 and the received or generated cosine signal 52.

In a step S04, a maximum value 54 of the calculation signal 53 is determined. In a step S05, a minimum value 55 of the calculation signal 53 is determined. The calculation of the maximum and the minimum values 54, 55 is advantageously carried out in each case as described above with respect to the device. In particular, one maximum and one minimum are ascertained within one complete electrical rotation of the resolver. For determining the maximum and minimum values 54, 55, an extrapolation and/or an interpolation of the calculation signal 53 may be carried out in a known manner.

In a step S06, a difference signal 56 is determined, which indicates an amplitude difference between the amplitude $U_{Sin\ Amp}$ of the sine signal 51 and an amplitude $U_{Cos\ Amp}$ of the cosine signal 52, as, or based on, a magnitude of a difference between the maximum value 54 and the minimum value 55. In a step S07, the sine signal 51 and the cosine signal 52 are plausibility-tested if the difference signal 56 lies within a predetermined range, in particular below a predetermined threshold.

In an optional additional step, a plausibility signal 57 may be output which indicates that the sine signal 51 and the cosine signal 52 are plausible, for example, by outputting a logical one. If they are not plausible, the plausibility signal 57 may indicate that the sine signal 51 and the cosine signal 52 are not plausible, for example, by outputting a logical zero.

Although the present invention has been described above based on preferred exemplary embodiments, it is not limited thereto, but rather may be modified in a variety of ways. In particular, the present invention may be changed or modified in manifold ways without departing from the essence of the present invention.

The invention claimed is:

1. A device for testing the plausibility of signals of a rotary encoder (2), including:
   a sine signal provision device (11) configured to provide a sine signal (51) of the rotary encoder (2) indicating a sine function of a time-dependent angle of rotation;
   a cosine provision device (12) configured to provide a cosine signal (52) of the rotary encoder (2) indicating a cosine function of the time-dependent angle of rotation;
   a computing device (14) configured to form a calculation signal (53) based on a sum of the provided sine signal (51) squared and the provided cosine signal (52) squared;
   a maximum value determination device (16) configured to determine a maximum value (54) of the calculation signal (53) within a single period of the sine signal (51) and the cosine signal (52);
   a minimum value determination device (18) configured to determine a minimum value (55) of the calculation signal (53) within the single period of the sine signal (51) and the cosine signal (52);
   a determination device (20) configured to determine a difference signal (56) indicating a magnitude of a difference between the determined maximum value (54) and the determined minimum value (55); and
   a plausibility testing device (22) configured to test the plausibility of the sine signal (51) and the cosine signal (52) based on if the difference signal (56) lies within a predetermined range.

2. A method for testing the plausibility of signals of a rotary encoder (2), including the steps of:
   providing (S01) a sine signal (51) of the rotary encoder (2) which indicates a sine function of a time-dependent angle of rotation;
   providing (S02) a cosine signal (52) of the rotary encoder (2) which indicates a cosine function of the time-dependent angle of rotation;
   forming (S03) a calculation signal (53) based on a sum of the provided sine signal (51) squared and the provided cosine signal (52) squared;
   determining (S04) a maximum value (54) of the calculation signal (53) within a period of the sine signal (51) and the cosine signal (52);
   determining (S05) a minimum value (55) of the calculation signal (53) within the period of the sine signal (51) and the cosine signal (52);
   determining (S06) a difference signal (56) which indicates a magnitude of a difference between the maximum value (54) and the minimum value (55);
   testing the plausibility (S07) of the sine signal (51) and the cosine signal (52) based on if the difference signal (56) lies within a predetermined range; and
   outputting a signal indicative of the plausibility of the sine signal (51) and the cosine signal (52).

* * * * *